United States Patent
Kamata (10) Patent No.: US 9,270,124 B2
(45) Date of Patent: Feb. 23, 2016

(54) CONTACTLESS POWER SUPPLY DEVICE

(75) Inventor: Koichiro Kamata, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 876 days.

(21) Appl. No.: 13/531,636

(22) Filed: Jun. 25, 2012

(65) Prior Publication Data

US 2013/0002036 A1   Jan. 3, 2013

(30) Foreign Application Priority Data

Jun. 30, 2011   (JP) ................. 2011-146469

(51) Int. Cl.
| H01F 27/42 | (2006.01) |
| H01F 37/00 | (2006.01) |
| H02J 17/00 | (2006.01) |
| H02J 5/00 | (2006.01) |
| H02J 7/00 | (2006.01) |
| H02J 7/02 | (2006.01) |
| H02J 7/34 | (2006.01) |

(52) U.S. Cl.
CPC ............... *H02J 5/005* (2013.01); *H02J 7/0013* (2013.01); *H02J 7/025* (2013.01); *H02J 7/345* (2013.01); *H02J 17/00* (2013.01)

(58) Field of Classification Search
CPC ......... H02J 5/005; H02J 7/0013; H02J 7/025; H02J 7/345; H02J 17/00
USPC ........................................................ 307/104
See application file for complete search history.

(56) References Cited

U.S. PATENT DOCUMENTS

| 7,764,046 | B2 | 7/2010 | Osada | |
| 8,143,746 | B2 * | 3/2012 | Marzetta et al. | 307/104 |
| 8,217,535 | B2 * | 7/2012 | Uchida et al. | 307/104 |
| 8,378,524 | B2 * | 2/2013 | Mita | 307/104 |
| 2010/0052431 | A1 | 3/2010 | Mita | |

(Continued)

FOREIGN PATENT DOCUMENTS

JP    2010-063245    3/2010

OTHER PUBLICATIONS

Kurs et al., "Wireless Power Transfer Via Strongly Coupled Magnetic Resonances", Science, Jul. 6, 2007, vol. 317, No. 5834, pp. 83-86.

(Continued)

*Primary Examiner* — Hal Kaplan
(74) *Attorney, Agent, or Firm* — Nixon Peabody LLP; Jeffrey L. Costellia (57) ABSTRACT

A contactless power supply device capable of appropriately supplying power to a plurality of power supplied devices at the same time without contact is provided. A contactless power supply device capable of supplying power without contact even when the positional flexibility of a plurality of power supplied devices is increased is provided. The contactless power supply device determines a power supply condition that power can be most appropriately supplied to a plurality of power supplied devices that need power supply in a short time. The contactless power supply device can appropriately supply power to a plurality of power supplied devices at the same time without contact by controlling the resonant capacitance of a power transmission coil in an optimized power supply condition. The positional flexibility of the plurality of power supplied devices with respect to the contactless power supply device can be increased.

22 Claims, 4 Drawing Sheets

(56) References Cited

U.S. PATENT DOCUMENTS

| | | |
|---|---|---|
| 2010/0244577 A1 | 9/2010 | Shimokawa |
| 2010/0244580 A1 | 9/2010 | Uchida et al. |
| 2010/0259109 A1 | 10/2010 | Sato |
| 2011/0133569 A1* | 6/2011 | Cheon et al. .................. 307/104 |
| 2011/0177783 A1 | 7/2011 | Baarman |
| 2011/0189954 A1 | 8/2011 | Baarman |
| 2011/0270462 A1 | 11/2011 | Amano et al. |
| 2011/0309688 A1 | 12/2011 | Yamazaki et al. |
| 2012/0025611 A1 | 2/2012 | Kamata et al. |
| 2012/0025627 A1 | 2/2012 | Shionoiri et al. |
| 2012/0025631 A1 | 2/2012 | Shionoiri et al. |
| 2012/0032521 A1 | 2/2012 | Inoue et al. |
| 2012/0062039 A1 | 3/2012 | Kamata et al. |

OTHER PUBLICATIONS

Miyamoto et al., Wireless Power Transfer System With a Simple Receiver Coil, IMWS 2011, (2011 IEEE MTT-S International Microwave Workshop Series), May 12, 2011, pp. 131-134.

* cited by examiner

CONTACTLESS POWER SUPPLY DEVICE

BACKGROUND OF THE INVENTION

1. Field of the Invention

The present invention relates to contactless power supply devices using resonance coupling.

2. Description of the Related Art

Contactless power supply devices for wirelessly supplying power to electronic devices without power cords or the like have been put to practical use. There are various wireless power supply techniques for supplying power to electronic devices that are separated, and an electromagnetic induction method and an electromagnetic wave transmission method are widely used. Further, in recent years, an electromagnetic resonance method, an electric field coupling method, and the like have attracted attention.

In an electromagnetic induction method, power is supplied using electromagnetic induction coupling generated between a power transmission coil and a power reception coil; thus, it is necessary to place the coils very closely.

In a magnetic resonance method, a magnetic field generated by supply of power to a power transmission coil is received in a power reception coil by using resonance coupling, the magnetic field is converted into power, and the converted power is supplied to an electronic device. This method comparatively strongly copes with positional deviation between coils; thus, a power transmission distance can be made long.

In the case where power is supplied from one contactless power supply device to one power supplied device, the resonance frequency of a power transmission coil preferably agrees with the resonance frequency of a power reception coil. Thus, in the case where power is supplied to a plurality of power supplied devices, power can be transmitted with high efficiency with the use of a plurality of power transmission coils having different specific resonance frequencies.

Patent Document 1 discloses a contactless power supply device for selectively supplying power to a plurality of power supplied devices having different specific resonance frequencies by discretely or successively changing the resonance frequency of one power transmission coil.

REFERENCE

Patent Document 1: Japanese Published Patent Application No. 2010-063245.

SUMMARY OF THE INVENTION

When power is supplied to a plurality of power supplied devices having different specific resonance frequencies at the same time with the use of one power transmission coil having specific resonance frequency, power transmission efficiency is decreased. Thus, in order to inhibit a decrease in power transmission efficiency, it is necessary to change the specific resonance frequency of the power transmission coil. However, it is very difficult to use different resonance frequency that is optimized for the plurality of power supplied devices by precisely controlling the inductance or resonant capacitance of the power transmission coil.

In view of the above problems, it is an object to provide a contactless power supply device capable of appropriately supplying power to a plurality of power supplied devices at the same time without contact.

It is an object to provide a contactless power supply device capable of supplying power without contact even when the positional flexibility of a plurality of power supplied devices is increased.

In order to inhibit a decrease in power transmission efficiency in the case of an increased number of power supplied devices, by controlling the resonant capacitance of a power transmission resonance coil included in a contactless power supply device and the oscillation frequency of a high frequency power source and optimizing the resonance frequency of the coil in a short time, power is appropriately supplied at the same time without contact.

One embodiment of the present invention disclosed in this specification is a contactless power supply device that includes a power transmission excitation coil supplied with alternating current (AC) from a high frequency power source, a power transmission resonance coil electromagnetically inductively coupled with the power transmission excitation coil, a variable capacitor for making the resonant capacitance of the power transmission resonance coil variable, a control circuit for changing the resonant capacitance and the oscillation frequency of the high frequency power source and storing the sum of power supplied from the power transmission resonance coil to a plurality of power supplied devices, and a detection circuit for determining the resonant capacitance and the oscillation frequency on the basis of the sum of the power.

In the contactless power supply device, the variable capacitor may be a variable condenser.

In the contactless power supply device, the variable capacitor may be a variable capacitance diode.

In the contactless power supply device, the resonant capacitance of the power transmission resonance coil and the oscillation frequency of the high frequency power source for optimizing the resonant frequency of the power transmission resonance coil can be determined in the following manner: the resonance frequency of the power transmission resonance coil is changed more than once by changing the resonant capacitance and the oscillation frequency of the high frequency power source with the use of the control circuit, the sum of power supplied from the power transmission resonance coil to the plurality of power supplied devices is stored for the number of times of the change, and the sum of the power for the number of times of the change is compared using the detection circuit. Note that the time taken to change the resonance frequency may be about several seconds.

In the contactless power supply device, the plurality of power supplied devices may have different specific resonance frequencies.

In the contactless power supply device, the number of high frequency power sources may be plural.

In the case where power is supplied to the plurality of power supplied devices by resonance coupling at the resonance frequency of the power transmission resonance coil that is determined as described above, a period during which power is supplied to the plurality of power supplied devices at the same time may be provided.

In the contactless power supply device, the number of oscillation frequencies of the high frequency power source may be equal to or larger than the number of power supplied devices. When resonance frequency that is optimized for the plurality of power supplied devices is used, power can be appropriately supplied to the plurality of power supplied devices having different specific resonance frequencies at the same time (also referred to as substantially at the same time) without contact.

In the contactless power supply device, the resonance coupling may be magnetic resonance coupling.

The above structure achieves at least one of the objects.

Note that the term "specific resonance frequency" in this specification means frequency which is obtained when power is supplied with the highest efficiency in the case where the ratio of the number of contactless power supply devices to the number of power supplied devices is 1:1.

Note that the expression "the same time" in this specification does not necessarily mean "exactly the same time". The expression "the same time" in this specification includes a slight time difference in an error range. In other words, even when starting times of supply of power to a plurality of power supplied devices are not perfectly coincident with each other, the expression "the same time" is used in some cases. Thus, the expression "power is supplied at the same time" in this specification means the case where at least a period during which power is supplied to a plurality of power supplied devices at exactly the same time is provided.

Further, in this specification, the term "positional flexibility" means not spatial (three-dimensional) arrangement flexibility in a contactless power supply device but a planar (two-dimensional) arrangement flexibility in a contactless power supply device.

According to one embodiment of the present invention, by controlling the resonant capacitance of a power transmission resonance coil and the oscillation frequency of a high frequency power source, the resonance frequency of the coil is optimized. Thus, it is possible to obtain a contactless power supply device capable of appropriately supplying power to a plurality of power supplied devices at the same time without contact. Further, since power can be supplied to a plurality of power supplied devices which are within a reasonable distance from the contactless power supply device at the same time, the positional flexibility of the power supplied device with respect to the contactless power supply device can be increased.

DETAILED DESCRIPTION OF THE INVENTION

An embodiment will be described in detail with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiment. Note that in structures of the present invention described below, the same portions or portions having similar functions are denoted by the same reference numerals in different drawings, and a description thereof is not repeated.

In this embodiment, examples of a contactless (also referred to as non-contact or contact-free) power supply device (also referred to as power feeding device) using magnetic resonance coupling according to one embodiment of the present invention are described with reference to FIG. 1, FIG. 2, FIG. 3, and FIG. 4.

Figure 1:
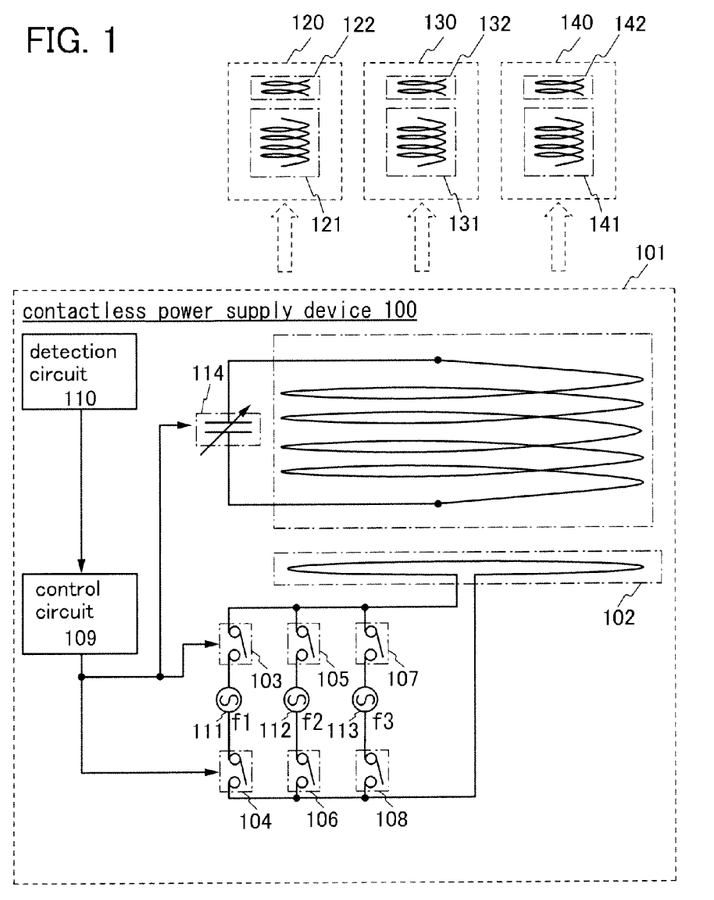
FIG. 1 illustrates a contactless power supply device according to an embodiment.

The contactless power supply device according to one embodiment of the present invention can appropriately supply power to a plurality of power supplied devices at the same time without contact. In FIG. 1, the number of high frequency power sources included in a contactless power supply device 100 according to one embodiment of the present invention is equal to the number of power supplied devices. In other words, FIG. 1 illustrates the case where the contactless power supply device 100 supplies power to three power supplied devices (a power supplied device 120, a power supplied device 130, and a power supplied device 140) that need power supply. In the contactless power supply device 100, the number of frequency (oscillation frequency) values of high-frequency power generated from one high frequency power source is one. Note that FIG. 1 schematically illustrates the contactless power supply device and the power supplied devices (including resonance coils and excitation coils).

Note that although the number of power supplied devices is three in FIG. 1, the number of power supplied devices is not limited to three. The description can be similarly applied to the case where the number of power supplied devices is n (n is a natural number of 2 or more). The shape and structure of the power supplied device are not particularly limited as long as the power supplied device is operated by contactless power supply. Further, a plurality of power supplied devices supplied with power without contact preferably have substantially the same shapes and structures. For example, the plurality of power supplied devices supplied with power without contact can be electronic devices such as smartphones.

The contactless power supply device 100 includes a power transmission resonance coil 101, a power transmission excitation coil 102, a switch 103, a switch 104, a switch 105, a switch 106, a switch 107, a switch 108, a control circuit 109, a detection circuit 110, a first high frequency power source 111, a second high frequency power source 112, a third high frequency power source 113, and a variable condenser 114 as a variable capacitor. The first, second and third high frequency power sources 111, 112 and 113 are electrically connected to both terminals of the power transmission excitation coil 102.

The first high frequency power source 111 generates high-frequency power at frequency $f_1$. The second high frequency power source 112 generates high-frequency power at frequency $f_2$. The third high frequency power source 113 generates high-frequency power at frequency $f_3$.

In addition, a frequency band used for the high frequency power source is preferably a frequency band of tens of kilo hertz to hundreds of mega hertz.

The variable condenser 114 is electrically connected to both terminals of the power transmission resonance coil 101. The variable condenser 114 changes the capacitance of the variable condenser 114 in response to a change in variable capacitor control signal output from the control circuit 109. Thus, the variable condenser 114 can change the resonant capacitance of the power transmission resonance coil 101 that is a resonance circuit, and can change the resonance frequency of the power transmission resonance coil 101.

Here, a parameter for changing the resonance frequency of a power transmission resonance coil is described as an example. The power transmission resonance coil is a resonance circuit. Thus, the resonance frequency of the power transmission resonance coil depends on the inductance of the power transmission resonance coil and the resonant capacitance of the power transmission resonance coil (in one embodiment of the present invention, the capacitance of a variable condenser).

$$f_0 = \frac{1}{2\pi\sqrt{(L)\times(C)}}$$

In this equation, L is the inductance of a power transmission resonance coil; C is the resonant capacitance of the power transmission resonance coil; and $f_0$ is the resonance frequency of the power transmission resonance coil. Thus, in order to change the resonance frequency, either one or both the inductance and the resonant capacitance may be changed.

Figure 2:
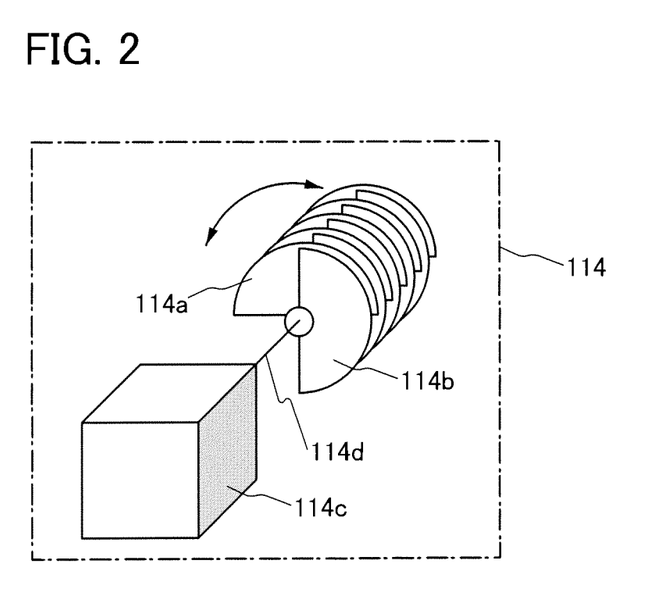
FIG. 2 illustrates a variable condenser according to the embodiment.

FIG. 2 illustrates a structure example of the variable condenser 114. The variable condenser 114 illustrated in FIG. 2 includes a fixed electrode 114a, a variable electrode 114b, a motor 114c, and a shaft 114d. Note that the fixed electrode 114a is an electrode whose position with respect to the shaft 114d does not change even when the shaft 114d rotates, and the variable electrode 114b is an electrode whose position with respect to the shaft 114d changes when the shaft 114d rotates. The electrodes are preferably formed using metal. By application of a potential difference between the variable electrode 114b and the fixed electrode 114a that are formed using metal, positive and negative electric charge is stored in these electrodes, so that these electrodes function as capacitors. The higher the capacitance is, the larger the amount of electric charge stored in the metal electrodes becomes.

The variable condenser 114 rotates the shaft 114d by using the motor 114c in response to a change in variable capacitor control signal (in this embodiment, a potential difference generated between the variable electrode 114b and the fixed electrode 114a) output from the control circuit 109. In that case, the capacitance of the variable condenser 114 is changed by a change in overlap area of the fixed electrode 114a and the variable electrode 114b or a change in distance between the fixed electrode 114a and the variable electrode 114b. In other words, the resonance frequency of the power transmission resonance coil 101 can be changed by controlling the resonant capacitance of the power transmission resonance coil 101. Note that the structure of the variable condenser 114 is not limited. As the variable capacitor, a variable capacitance diode or the like can be used instead of the variable condenser. The variable capacitor may be any variable capacitor as long as it has a function of changing the resonance frequency of the power transmission resonance coil 101 (the resonant capacitance of the power transmission resonance coil 101).

When the resonance frequency of the power transmission excitation coil 102 (the oscillation frequency of the first high frequency power source 111) is $f_1$ and the capacitance of the variable condenser 114 is $C_1$, the resonance frequency of the power transmission resonance coil 101 is $f_2$. When the resonance frequency of the power transmission excitation coil 102 (the oscillation frequency of the second high frequency power source 112) is $f_2$ and the capacitance of the variable condenser 114 is $C_2$, the resonance frequency of the power transmission resonance coil 101 is $f_2$. When the resonance frequency of the power transmission excitation coil 102 (the oscillation frequency of the third high frequency power source 113) is $f_3$ and the capacitance of the variable condenser 114 is $C_3$, the resonance frequency of the power transmission resonance coil 101 is $f_3$.

When the resonance frequency of the power transmission resonance coil 101 is $f_1$, power can be appropriately supplied to one power supplied device which is within a reasonable distance from the contactless power supply device among three power supplied devices without contact. The resonance frequency $f_1$ is optimum frequency for one power supplied device. When the resonance frequency of the power transmission resonance coil 101 is $f_2$, power can be appropriately supplied to two power supplied devices which are within a reasonable distance from the contactless power supply device among three power supplied devices at the same time without contact. The resonance frequency $f_2$ is optimum frequency for two power supplied devices. When the resonance frequency of the power transmission resonance coil 101 is $f_3$, power can be appropriately supplied to all three power supplied devices at the same time without contact. The resonance frequency $f_3$ is optimum frequency for three power supplied devices. Note that resonance frequency used for magnetic resonance coupling preferably has a frequency band of 10 kHz to 100 MHz. The resonance frequency is preferably changed as appropriate depending on the use of a power supplied device.

Note that the optimum frequency means resonance frequencies of the power transmission resonance coil 101 and the power transmission excitation coil 102 that can appropriately supply power to a plurality of power supplied devices at the same time without contact. The optimum frequency is different from specific resonance frequency in some cases.

Note that in this embodiment, appropriate power supply means power supply with high power transmission efficiency and supply of power required by a plurality of power supplied devices to the plurality of power supplied devices at the same time without contact. When appropriate power supply is performed, the resonance frequencies of the power transmission resonance coil 101 and the power transmission excitation coil 102 are optimized.

Here, two indicators for determining power transmission efficiency between two coils that generate magnetic resonance coupling (a power transmission resonance coil and a power reception resonance coil) are described. One indicator is an indicator k of coupling strength of the power transmission resonance coil and the power reception resonance coil and is expressed by the following equation.

$$k = \frac{M}{\sqrt{L_1 \times L_2}}$$

In this equation, $L_1$ is the inductance of the power transmission resonance coil; $L_2$ is the inductance of the power reception resonance coil; and M is mutual inductance. Note that k depends on a distance between the coils. The other indicator is an indicator Q of resonance sharpness of the power transmission resonance coil and is expressed by the following equation.

$$Q = \left(\frac{1}{R}\right) \times \left(\frac{L_1}{C}\right)^{\frac{1}{2}} = \frac{2\pi f_0 L_1}{R}$$

In this equation, $L_1$ is the inductance of the power transmission resonance coil; C is the resonant capacitance of the power transmission resonance coil; R is the resistance of the power transmission resonance coil; and $f_0$ is the resonance frequency of the power transmission resonance coil. Note that Q gives an indication of the quality of the coil. As Q becomes higher, power loss of the power transmission resonance coil decreases; thus, it is possible to increase the efficiency of power that can be transmitted from the power transmission resonance coil to the power reception resonance coil. Note that Q is preferably 100 or higher. In other words, the power transmission efficiency depends on a transmission distance (a distance between the power transmission resonance coil and the power reception resonance coil) and the resonance frequency of the power transmission resonance coil.

The control circuit 109 has a function of controlling the switch 103, the switch 104, the switch 105, the switch 106, the switch 107, the switch 108, and the variable condenser 114 and has a function of changing the resonant capacitance of the power transmission resonance coil 101, the oscillation frequency of the first high frequency power source 111, the oscillation frequency of the second high frequency power source 112, and the oscillation frequency of the third high frequency power source 113. In addition, the control circuit 109 has a function of retaining appropriate data (data such as the number of power supplied devices that need power supply, reception power supplied to a plurality of power supplied devices, and individual certification ID of each power supplied device). For example, in the case where the switch 103 and the switch 104 are turned on and the switch 105, the switch 106, the switch 107, and the switch 108 are turned off, AC having the frequency $f_1$ is supplied from the first high frequency power source 111 to the power transmission excitation coil 102, and the resonant capacitance of the power transmission resonance coil 101 is set to $C_1$. In the case where the switch 105 and the switch 106 are turned on and the switch 103, the switch 104, the switch 107, and the switch 108 are turned off, AC having the frequency $f_2$ is supplied from the second high frequency power source 112 to the power transmission excitation coil 102, and the resonant capacitance of the power transmission resonance coil 101 is set to $C_2$. In the case where the switch 107, the switch 108, the switch 103, and the switch 104 are turned on and the switch 105 and the switch 106 are turned off, AC having the frequency $f_3$ is supplied from the third high frequency power source 113 to the power transmission excitation coil 102, and the resonant capacitance of the power transmission resonance coil 101 is set to $C_3$.

The detection circuit 110 has a function of determining an optimum power supply condition depending on appropriate data (data such as the number of power supplied devices that need power supply, reception power supplied to a plurality of power supplied devices, and individual certification ID of each power supplied device). The detection circuit 110 is electrically connected to the control circuit 109. Note that an optimum power supply condition in this specification means resonant capacitance of a power transmission resonance coil and oscillation frequency of a high frequency power source that can appropriately supply power to a plurality of power supplied devices at the same time without contact.

The power supplied device 120 includes at least a power reception resonance coil 121 and a power reception excitation coil 122. Electromagnetic induction coupling is generated between the power reception resonance coil 121 and the power reception excitation coil 122 in the power supplied device 120. The power supplied device 130 includes at least a power reception resonance coil 131 and a power reception excitation coil 132. Electromagnetic induction coupling is generated between the power reception resonance coil 131 and the power reception excitation coil 132 in the power supplied device 130. The power supplied device 140 includes at least a power reception resonance coil 141 and a power reception excitation coil 142. Electromagnetic induction coupling is generated between the power reception resonance coil 141 and the power reception excitation coil 142 in the power supplied device 140.

Next, a method for supplying power from the contactless power supply device 100 to one power supplied device is described. Electromagnetic induction coupling is generated between the power transmission resonance coil 101 and the power transmission excitation coil 102 in the contactless power supply device 100. Thus, when AC having the frequency $f_1$ is supplied to the power transmission excitation coil 102, the AC (induced current) having the frequency $f_1$ is also supplied to the power transmission resonance coil 101. The power supplied to the power transmission resonance coil 101 oscillates the power transmission resonance coil 101 at the resonance frequency $f_1$ and generates a magnetic field. At this time, in the case where the resonance frequency of a power reception resonance coil in one power supplied device which is within a reasonable distance from the contactless power supply device agrees with the resonance frequency $f_1$ of the power transmission resonance coil 101, a power transmission path is formed, and the power is delivered through the magnetic field and is transmitted to a power reception resonance coil (a power reception resonance coil in one of the power supplied device 120, the power supplied device 130, and the power supplied device 140) (magnetic resonance coupling).

Similarly, a method for supplying power from the contactless power supply device 100 to two power supplied devices at the same time is described. Electromagnetic induction coupling is generated between the power transmission resonance coil 101 and the power transmission excitation coil 102 in the contactless power supply device 100. Thus, when AC having the frequency $f_2$ is supplied to the power transmission excitation coil 102, the AC (induced current) having the frequency $f_2$ is also supplied to the power transmission resonance coil 101. The power supplied to the power transmission resonance coil 101 oscillates the power transmission resonance coil 101 at the resonance frequency $f_2$ and generates a magnetic field. At this time, in the case where the resonance frequencies of power reception resonance coils in two power supplied devices which are within a reasonable distance from the contactless power supply device agree with the resonance frequency $f_2$ of the power transmission resonance coil 101, two power transmission paths are formed, and the power is delivered through the magnetic field and is transmitted to two power reception resonance coils (power reception resonance coils in two of the power supplied device 120, the power supplied device 130, and the power supplied device 140) at the same time (magnetic resonance coupling). Note that the frequency $f_2$ is optimum frequency for the two power supplied devices; however, the frequency $f_2$ is not necessarily specific resonance frequency of each of the two power reception resonance coils.

Similarly, a method for supplying power from the contactless power supply device 100 to three (all) power supplied devices at the same time is described. Electromagnetic induction coupling is generated between the power transmission resonance coil 101 and the power transmission excitation coil 102 in the contactless power supply device 100. Thus, when AC having the frequency $f_3$ is supplied to the power transmission excitation coil 102, the AC (induced current) having the frequency $f_3$ is also supplied to the power transmission resonance coil 101. The power supplied to the power transmission resonance coil 101 oscillates the power transmission resonance coil 101 at the resonance frequency $f_3$ and generates a magnetic field. At this time, in the case where the resonance frequencies of power reception resonance coils in three power supplied devices which are within a reasonable distance from the contactless power supply device agree with the resonance frequency $f_3$ of the power transmission resonance coil 101, three power transmission paths are formed, and the power is delivered through the magnetic field and is transmitted to three (all) power reception resonance coils at the same time (magnetic resonance coupling). Note that the frequency $f_3$ is optimum frequency for the three power supplied devices; however, the frequency $f_3$ is not necessarily specific resonance frequency of each of the three power reception resonance coils.

With this structure, by controlling the resonant capacitance of the power transmission resonance coil 101 and the oscillation frequency of the high frequency power source, the resonance frequency of the power transmission resonance coil 101 can be optimized. Thus, with the use of the contactless power supply device 100, power can be appropriately supplied to a plurality of power supplied devices at the same time without contact. Note that with this structure, since power can be appropriately supplied to a plurality of power supplied devices which are within a reasonable distance from the contactless power supply device at the same time without contact, the positional flexibility of the power supplied device with respect to the contactless power supply device can be increased.

Note that optimization of resonance frequency of a power transmission resonance coil means changing resonance frequency of a power transmission resonance coil so that power is appropriately supplied to a plurality of power supplied devices. Thus, even when the resonance frequency of a power transmission resonance coil is optimum frequency, the same power is not necessarily supplied to a plurality of power supplied devices. The resonance frequency may be changed so that power is supplied to the plurality of power supplied devices with high efficiency or power is mainly supplied to a power supplied device which is to be fully charged most quickly. Further, the resonance frequency may be changed in consideration of the remaining amounts of charge in the plurality of power supplied devices or charge capacity. The resonance frequency is preferably changed as appropriate in consideration of power transmission efficiency, recharge time, the remaining amount of charge, charge capacity, or the like. The resonant capacitance and the oscillation frequency of the high frequency power source are preferably controlled so that the resonance frequency of the power transmission resonance coil is optimum frequency.

Figure 3:
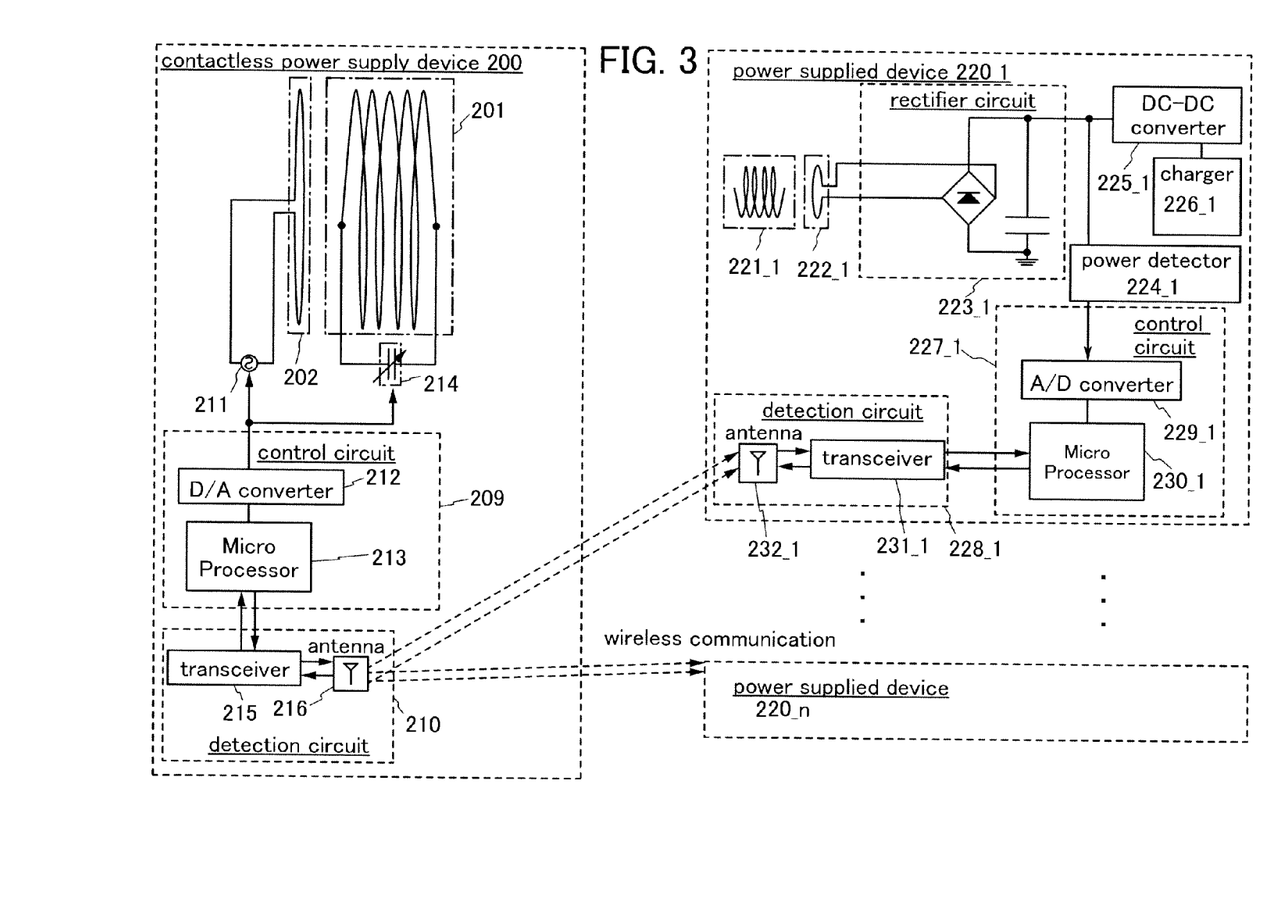
FIG. 3 illustrates a contactless power supply device according to the embodiment.
Figure 4:
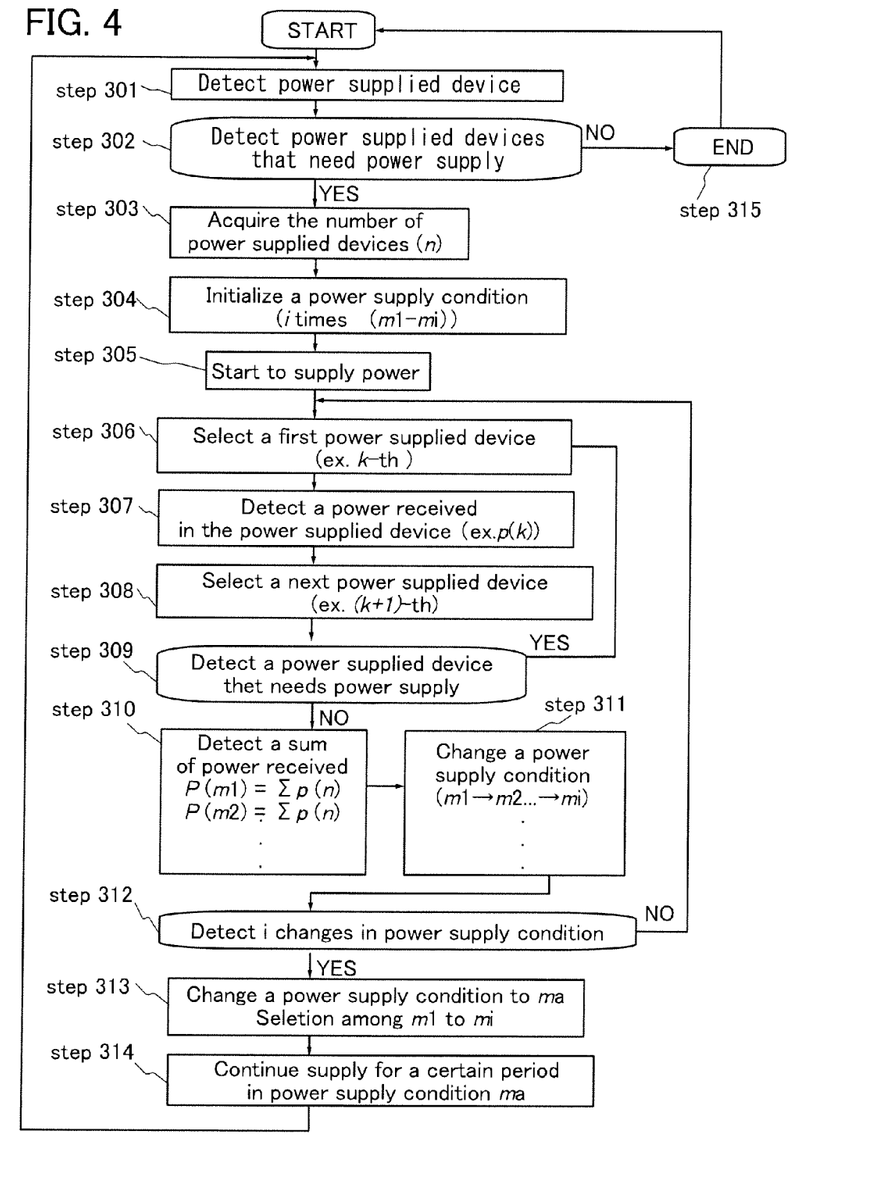
FIG. 4 shows a power supply method according to the embodiment.

Next, an example of a method for supplying power from a contactless power supply device according to one embodiment of the present invention to n (n is a natural number of two or more) power supplied devices is described with reference to FIG. 3 and FIG. 4. FIG. 3 illustrates examples of the contactless power supply device according to one embodiment of the present invention and the n power supplied devices. FIG. 4 is a flow chart illustrating an example of the method for supplying power from the contactless power supply device according to one embodiment of the present invention to the n power supplied devices. Note that a specific method for optimizing the resonant capacitance of a power transmission resonance coil and the oscillation frequency of a high frequency power source is also described.

A contactless power supply device 200 includes a power transmission resonance coil 201, a power transmission excitation coil 202, a control circuit 209, a detection circuit 210, a high frequency power source 211, and a variable condenser 214. The control circuit 209 includes a D/A (digital/analog) converter 212 and a microprocessor (μP) 213. The detection circuit 210 includes a transceiver 215 and an antenna 216.

A power supplied device 220 includes a power reception resonance coil 221, a power reception excitation coil 222, a rectifier circuit 223, a power detector 224, a DC(direct current)-DC converter 225, a charger 226, a control circuit 227, and a detection circuit 228. The control circuit 227 includes an A/D (analog/digital) converter 229 and a microprocessor 230. The detection circuit 228 includes a transceiver 231 and an antenna 232.

Note that in FIG. 3, the number of power supplied devices is n; thus, for example, components of a first power supplied device 220_1 are represented as follows: a power reception resonance coil 221_1, a power reception excitation coil 222_1, a rectifier circuit 223_1, a power detector 224_1, a DC-DC converter 225_1, a charger 226_1, a control circuit 227_1, a detection circuit 228_1, an A/D converter 229_1, a microprocessor 230_1, a transceiver 231_1, and an antenna 232_1.

Similarly, components of a second power supplied device 220_2 are represented as follows: a power reception resonance coil 221_2, a power reception excitation coil 222_2, a rectifier circuit 223_2, a power detector 224_2, a DC-DC converter 225_2, a charger 226_2, a control circuit 227_2, a detection circuit 228_2, an A/D converter 229_2, a microprocessor 230_2, a transceiver 231_2, and an antenna 232_2.

Similarly, components of an n-th power supplied device 220_n are represented as follows: a power reception resonance coil 221_n, a power reception excitation coil 222_n, a rectifier circuit 223_n, a power detector 224_n, a DC-DC converter 225_n, a charger 226_n, a control circuit 227_n, a detection circuit 228_n, an A/D converter 229_n, a microprocessor 230_n, a transceiver 231_n, and an antenna 232_n**.

An example of a method for supplying power from the contactless power supply device 200 according to one embodiment of the present invention to the n (n is a natural number of two or more) power supplied devices is described below with reference to FIG. 4 by dividing the entire step into steps 301 to 314.

In the first step 301, the contactless power supply device 200 detects the presence or absence of a power supplied device. By wireless communication between the detection circuit 210 in the contactless power supply device 200 and the detection circuit 228 in the power supplied device 220, the contactless power supply device 200 detects the presence or absence of a power supplied device that needs power supply.

In the second step 302, when the contactless power supply device 200 does not detect the power supplied device (No), a fifteenth step 315 is performed or a "start" step is performed again. When the contactless power supply device 200 detects the power supplied device (Yes), the third step 303 is performed. Note that the detected power supplied device is limited to a power supplied device that needs power supply. A fully-charged power supplied device and a power supplied device that does not need power supply are outside the scope of the detected power supplied device.

In the third step 303, the contactless power supply device 200 acquires data such as the number of power supplied devices that need power supply and individual certification ID of each power supplied device. In FIG. 3 and FIG. 4, the number of power supplied devices that need power supply is n. Note that after the data is detected in the detection circuit 210, the data is retained in the microprocessor 213 in the control circuit 209.

In the fourth step 304, a power supply condition is initialized. Note that a power supply condition in one embodiment of the present invention is set using the oscillation frequency of a high frequency power source in a contactless power supply device and the capacitance of a variable condenser as parameters. For example, a power supply condition m is a condition that the oscillation frequency of the high frequency power source 211 in the contactless power supply device 200 is set to $f_m$ and the capacitance of the variable condenser 214 (the resonant capacitance of the power transmission resonance coil 201) is set to $C_m$.

Note that in this embodiment, the power supply condition is changed i times and power supply is performed i times. For example, an initialized power supply condition is denoted by m1; a power supply condition after two changes is denoted by m2; a power supply condition after three changes is denoted by m3; and a power supply condition after i changes is denoted by mi. Further, a power supply condition that power is most appropriately supplied among i power supplies (from power supply (first power supply) in the initialized power supply condition m1 to power supply (i-th power supply) in the power supply condition mi after i changes) is set to an optimum power supply condition. The optimum power supply condition is denoted by ma (optimum frequency $f_{ma}$ and capacitance $C_{ma}$).

Note that when power supply is performed in the optimum power supply condition, the contactless power supply device 200 can most appropriately supply power to the n power supplied devices by selecting an optimum power supply condition from i power supply conditions in the first to i-th power supplies.

When the resonance frequency of a power reception resonance coil 221_k is $f_{ma}$, power is most appropriately supplied to the n power supplied devices in the i power supplies (the first to i-th power supplies). The resonance frequency $f_{ma}$ is the optimum resonance frequency of the power reception resonance coil 221 (any one of 221_1 to 221_n).

The resonance frequency of the power reception resonance coil 221_k in a k-th power supplied device 220_k is described. When the resonance frequency of the power reception resonance coil 221_k is $f_k$, power is supplied with the highest efficiency to the k-th power supplied device which is within a reasonable distance from the contactless power supply device. The resonance frequency $f_k$ is the specific resonance frequency of the power reception resonance coil 221_k.

In the fourth step 304, the power supply condition is initialized and set to m1 (oscillation frequency $f_{m1}$ and capacitance $C_{m1}$). Specifically, the control circuit 209 in the contactless power supply device 200 sets the oscillation frequency of the high frequency power source 211 to $f_{m1}$ and sets the capacitance of the variable condenser 214 to $C_{m1}$. Thus, AC having the frequency $f_{m1}$ is supplied from the high frequency power source 211 to the power transmission excitation coil 202, so that electromagnetic induction coupling is generated between the power transmission excitation coil 202 and the power transmission resonance coil 201. Consequently, the AC (induced current) having the frequency $f_{m1}$ is also supplied to the power transmission resonance coil 201. Note that in the fourth step 304, the power supply condition is initialized i times.

In the fifth step 305, the contactless power supply device 200 turns on the output of the high frequency power source 211, and starts to supply power to power supplied devices that need power supply (in this embodiment, n power supplied devices).

In the sixth step 306, the contactless power supply device 200 selects the power supplied device 220_k which is firstly supplied with power from the power supplied devices that need power supply on the basis of data such as the number of power supplied devices that need power supply and individual certification ID of each power supplied device that is acquired in the third step 303. Magnetic resonance coupling is generated between the power transmission resonance coil 201 and the power reception resonance coil 221_k. Note that the oscillation frequency $f_1$ of the high frequency power source 211 that is set by the initialization of the first power supply condition (the resonance frequency $f_{m1}$ of the power transmission resonance coil 201) is not necessarily the optimum frequency $f_{m1}$ or the specific resonance frequency $f_k$ of the power reception resonance coil 221_k.

In the seventh step 307, the contactless power supply device 200 detects power received in the power supplied device 220_k that is selected in the sixth step 306. Specifically, when the power is transmitted to the power reception resonance coil 221_k of the power supplied device 220_k by magnetic resonance coupling, AC having the frequency $f_{m1}$ is supplied to the power reception resonance coil 221_k. Electromagnetic induction coupling is generated between the power reception resonance coil 221_k and a power reception excitation coil 222_k; thus, the AC (induced current) having the frequency $f_{m1}$ is also supplied to the power reception excitation coil 222_k. AC and AC voltage are converted into DC and DC voltage, respectively, by a rectifier circuit 223_k.

After that, a power detector 224_k detects the power received in the power supplied device 220_k. A control circuit 227_k catches the power received in the power supplied device 220_k that is detected by the power detector 224_k. A detection circuit 228_k detects the reception power by the control circuit 227_k. The detection circuit 210 also detects the reception power from the detection circuit 228_k by wireless communication. Thus, the contactless power supply device 200 can detect power received in the power supplied device 220_k. Note that the reception power is expressed by the following equation.

$$p(k)$$

In the eighth step 308, the contactless power supply device 200 selects the next power supplied device 220_(k+1) on the basis of data such as the number of power supplied devices that need power supply and individual certification ID of each power supplied device that is acquired in the third step 303.

In the ninth step 309, the contactless power supply device detects the presence or absence of a power supplied device that needs power supply. By wireless communication between the detection circuit 210 in the contactless power supply device 200 and the detection circuit 228 in the power supplied device, the contactless power supply device 200 detects the presence or absence of a power supplied device that needs power supply. When the contactless power supply device 200 does not detect the power supplied device that needs power supply, the tenth step 310 is performed. When the contactless power supply device 200 detects the power supplied device that needs power supply, the seventh step 307 is performed again.

The case where the seventh step 307 is performed again is similar to the case where the contactless power supply device 200 selects the power supplied device 220_k. Between the power transmission resonance coil 201 and a power reception resonance coil 221_(k+1), a power transmission path is formed and magnetic resonance coupling is generated. Note that the oscillation frequency $f_{m1}$ of the high frequency power source 211 that is set by the initialization of the next power supply condition (the resonance frequency $f_{m1}$ of the power transmission resonance coil 201) is not necessarily the optimum frequency $f_{ma}$ or the specific resonance frequency $f_{(k+1)}$ of the power reception resonance coil 221_(k+1).

The contactless power supply device 200 detects power received in the next power supplied device 220_(k+1) that is selected in the eighth step 308. Specifically, when the power is transmitted to the power reception resonance coil 221_(k+1) of the power supplied device 220_(k+1), AC having the frequency $f_{(k+1)}$ is supplied to the power reception resonance coil 221_(k+1). Electromagnetic induction coupling is generated between the power reception resonance coil 221_(k+1) and a power reception excitation coil 222_(k+1); thus, the AC (induced current) having the frequency $f_{(k+1)}$ is also supplied to the power reception excitation coil 222_(k+1). AC and AC voltage are converted into DC and DC voltage, respectively, by a rectifier circuit 223_(k+1).

After that, a power detector 224_(k+1) detects the power received in the power supplied device 220_(k+1). A control circuit 227_(k+1) catches the power received in the power supplied device 220_(k+1) that is detected by the power detector 224_(k+1). A detection circuit 228_(k+1) detects the reception power by the control circuit 227_(k+1). The detection circuit 210 also detects the reception power from the detection circuit 228_(k+1) by wireless communication. Thus, the contactless power supply device 200 can detect power received in the power supplied device 220_(k+1). Note that the reception power is expressed by the following equation.

$$p(k+1)$$

As described above, the seventh step 307 and the eighth step 308 are repeatedly performed on all the n power supplied devices 220 (220_1 to 220_n) that need power supply, and the contactless power supply device 200 acquires n power (p(1), p(2) . . . p(k), p(k+1) . . . p(n)) received in the n power supplied devices 220 (220_1 to 220_n).

In the tenth step 310, the contactless power supply device 200 calculates the sum of the power received in the n power supplied devices 220 (220_1 to 220_n) that is acquired in the first power supply (the power supply condition m1) with the use of the detection circuit 210. Further, the power received in the n power supplied devices 220 (220_1 to 220_n) and the sum of the power are stored in the microprocessor 213 in the control circuit 209. Note that the sum of the power received in the n power supplied devices 220 (220_1 to 220_n) in the first power supply is expressed by the following equation.

$$P(m_1)=\Sigma p(n)=p(1)+p(2)+\ldots+p(k)+p(k+1)+\ldots+p(n)$$

In the eleventh step 311, the power supply condition is changed. That is, the initialized power supply condition m1 (the oscillation frequency $f_{m1}$ and the capacitance $C_{m1}$) is changed. Specifically, by using the sum of the power received in the n power supplied devices 220 (220_1 to 220_n) in the first power supply that is stored in the microprocessor 213, the oscillation frequency of the high frequency power source 211 and the capacitance of the variable condenser 214 (the resonant capacitance of the power transmission resonance coil 201) are changed into a power supply condition m2 (oscillation frequency $f_{m2}$ and capacitance $C_{m2}$).

Thus, AC having the frequency $f_{m2}$ is supplied from the high frequency power source 211 to the power transmission excitation coil 202, so that the AC (induced current) having the frequency $f_{m2}$ is also supplied to the power transmission resonance coil 201 by electromagnetic induction coupling. Note that the oscillation frequency $f_{m2}$ of the high frequency power source 211 that is set by one change in the power supply condition (the resonance frequency $f_{m2}$ of the power transmission resonance coil 201) is not necessarily the optimum frequency $f_{ma}$ or the specific resonance frequency ($f_1$, $f_2 \ldots f_k$, $f_{(k+1)} \ldots f_n$) of the power reception resonance coil 221. Similarly, the oscillation frequency $f_{mi}$ of the high frequency power source 211 that is set by i changes in the power supply condition (the resonance frequency $f_{mi}$ of the power transmission resonance coil 201) is not necessarily the optimum frequency $f_{ma}$ or the specific resonance frequency ($f_1$, $f_2 \ldots f_k$, $f_{(k+1)} \ldots f_n$) of the power reception resonance coil 221.

Note that the capacitance of the variable condenser 214 can be controlled by the control circuit 209. When the capacitance of the variable condenser 214 (the resonant capacitance of the power transmission resonance coil 201) is changed from $C_{m1}$ into $C_{m2}$, the resonance frequency of the power transmission resonance coil 201 can be changed from $f_{m1}$ into $f_{m2}$. Similarly, when the capacitance of the variable condenser 214 (the resonant capacitance of the power transmission resonance coil 201) is changed from $C_{m(i-1)}$ into $C_{mi}$ the resonance frequency of the power transmission resonance coil 201 can be changed from $f_{m(i-1)}$ into $f_{mi}$. When the power supply condition is changed i times, the resonance frequency of the power transmission resonance coil 201 can be optimized.

In the twelfth step 312, the contactless power supply device 200 detects whether the power supply condition is changed i times. When the contactless power supply device 200 detects i changes in the power supply condition, the thirteenth step 313 is performed. When the contactless power supply device 200 does not detect i changes in the power supply condition, the sixth step 306 is performed again. Note that a time interval between the start of power supply in the power supply condition m1 (the fifth step 305) to the finish of power supply in the power supply condition mi (the twelfth step 312) is approximately several seconds. The time interval depends on the performance of changing the resonant capacitance of the power transmission resonance coil (variable capacitor).

In the case where the sixth step 306 is performed again, the seventh to eleventh steps 307 to 311 are repeatedly performed until the power supply condition is changed i times, as described above. The power supply condition is repeatedly changed from ml, m2 . . . mi. Note that when the seventh to eleventh steps 307 to 311 are repeatedly performed i times, the sums of i reception power (the sum of power received in the n power supplied devices 220 (220_1 to 220_n) in the first power supply (the power supply condition m1) to the sum of power received in the n power supplied devices 220 (220_1 to 220_n) in the i-th power supply (the power supply condition mi)) are stored in the microprocessor 213 in the contactless power supply device 200.

In the thirteenth step 313, the contactless power supply device 200 compares the sums of power received in the n power supplied devices 220 (220_1 to 220_n) that are stored in the microprocessor 213, and changes the power supply condition again. Specifically, the power supply condition mi is changed into a power supply condition ma by comparing i power supply conditions (the power supply condition m1 (the oscillation frequency $f_{m1}$ and the capacitance $C_{m1}$) that is set by initialization of the power supply condition to the power supply condition mi (the oscillation frequency $f_{mi}$ and the capacitance $C_{mi}$) that is set by i changes in the power supply condition) and selecting the power supply condition ma (the oscillation frequency $f_{ma}$ and the capacitance $C_{ma}$) that power is most appropriately supplied.

When a variable capacitor control signal output from the control circuit 209 is changed, the capacitance of the variable condenser 214 can be changed. When the capacitance of the variable condenser 214 (the resonant capacitance of the power transmission resonance coil 201) is set to $C_{ma}$ and the oscillation frequency of the high frequency power source 211 is set to $f_{ma}$, the resonance frequency of the power transmission resonance coil 201 can be optimized ($f_{ma}$). The resonance frequency $f_{ma}$ of the power transmission resonance coil 201 can be regarded as optimum frequency in all the power reception resonance coils 221 (221_1 to 221_n) in the n power supplied devices 220 (220_1 to 220_n). Thus, the contactless power supply device 200 can most appropriately supply power to the n power supplied devices by selecting an optimized power supply condition from i power supply conditions in the first to i-th power supplies. Note that at this time, the shape of the power transmission resonance coil is not changed; thus, the inductance of the power transmission resonance coil is not changed.

In the fourteenth step 314, power is continuously supplied for a certain period in the power supply condition ma (the frequency $f_{ma}$ and the capacitance $C_{ma}$) that is changed in the thirteenth step 313. Note that the certain period is preferably ten seconds or shorter. When the power supply time is set to a certain period, power can be stably supplied independently of the position or state of the power supplied device. After that, the first step 301 is performed again, and the second to fourteenth steps are repeated similarly.

With the structure, a contactless power supply device can determine a power supply condition that power can be most appropriately supplied to a plurality of power supplied devices that need power supply in a short time. The contactless power supply device can appropriately supply power to a plurality of power supplied devices at the same time without contact by changing the resonant capacitance of a power transmission coil and the oscillation frequency of a high frequency power source on the basis of an optimized power supply condition.

This application is based on Japanese Patent Application serial No. 2011-146469 filed with Japan Patent Office on Jun. 30, 2011, the entire contents of which are hereby incorporated by reference.

What is claimed is:

1. A contactless power supply device comprising:
a plurality of high frequency power sources;
an excitation coil configured to be supplied with alternating current from a one of the plurality of high frequency power sources;
a resonance coil electromagnetically inductively coupled with the excitation coil;
a variable capacitor electrically connected to the resonance coil; and
a control circuit electrically connected to the variable capacitor,
wherein the control circuit is configured to select the one of the plurality high frequency power sources for changing oscillation frequency, and
wherein the variable capacitor is configured to make resonant capacitance of the resonance coil variable.

2. The contactless power supply device according to claim 1, wherein the variable capacitor is a variable condenser.

3. The contactless power supply device according to claim 1, wherein the variable capacitor is a variable capacitance diode.

4. The contactless power supply device according to claim 1, wherein the control circuit is configured to store a sum of power supplied from the resonance coil to a plurality of power supplied devices.

5. The contactless power supply device according to claim 4, the contactless power supply device further comprising a detection circuit electrically connected to the control circuit,
wherein the detection circuit is configured to determine the resonant capacitance and the oscillation frequency on the basis of the sum of the power.

6. The contactless power supply device according to claim 4, wherein the plurality of power supplied devices have different specific resonance frequencies.

7. The contactless power supply device according to claim 4, wherein a period during which power is supplied to the plurality of power supplied devices at the same time is provided when power is supplied to the plurality of power supplied devices by resonance coupling at the determined resonance frequency of the resonance coil.

8. A contactless power supply device comprising:
a plurality of high frequency power sources;
an excitation coil configured to be supplied with alternating current from a one of the plurality of high frequency power sources;
a resonance coil electromagnetically inductively coupled with the excitation coil;
a variable capacitor electrically connected to the resonance coil; and
a control circuit including a digital/analog converter and a microprocessor,
wherein the digital/analog converter is electrically connected to the microprocessor,
wherein the digital/analog converter is electrically connected to the variable capacitor and the plurality of high frequency power sources,
wherein the control circuit is configured to select the one of the plurality of high frequency power sources for changing oscillation frequency, and
wherein the variable capacitor is configured to make resonant capacitance of the resonance coil variable.

9. The contactless power supply device according to claim 8, wherein the variable capacitor is a variable condenser.

10. The contactless power supply device according to claim 8, wherein the variable capacitor is a variable capacitance diode.

11. The contactless power supply device according to claim 8, wherein the control circuit is configured to store a sum of power supplied from the resonance coil to a plurality of power supplied devices.

12. The contactless power supply device according to claim 11, the contactless power supply device further comprising a detection circuit electrically connected to the control circuit,
wherein the detection circuit is configured to determine the resonant capacitance and the oscillation frequency on the basis of the sum of the power.

13. The contactless power supply device according to claim 12,
wherein the detection circuit comprises a transceiver electrically connected to an antenna, and
wherein the transceiver is electrically connected to the microprocessor.

14. The contactless power supply device according to claim 11, wherein the plurality of power supplied devices have different specific resonance frequencies.

15. The contactless power supply device according to claim 11, wherein a period during which power is supplied to the plurality of power supplied devices at the same time is provided when power is supplied to the plurality of power supplied devices by resonance coupling at the determined resonance frequency of the resonance coil.

16. A contactless power supply method for a contactless power supply device comprising:
a plurality of high frequency power sources;
an excitation coil;
a resonance coil electromagnetically inductively coupled with the excitation coil; and a variable capacitor electrically connected to the resonance coil, the method comprising the steps of:

supplying alternating current having oscillation frequency of a one selected from the plurality of high frequency power sources to the excitation coil;

transmitting the alternating current to the resonance coil; and transmitting power to a plurality of power supplied devices when oscillation frequency of the resonance coil corresponds to oscillation frequency of the plurality of power supplied devices, wherein the power is supplied to the plurality of power supplied devices at the same time.

17. The contactless power supply method according to claim 16, the contactless power supply method further comprising the step of detecting the plurality of power supplied devices before the supplying step.

18. The contactless power supply method according to claim 16, the contactless power supply method further comprising the steps of:

changing the oscillation frequency by selecting the plurality of the high frequency power sources; and varying the resonant capacitance of the resonance coil by the variable capacitor.

19. The contactless power supply method according to claim 16, the contactless power supply method further comprising the steps of:

storing a sum of power supplied from the resonance coil to the plurality of power supplied devices, and determining the oscillation frequency of the resonance coil and any one of the plurality of the high frequency power sources on the basis of the sum of the power.

20. The contactless power supply method according to claim 16, wherein the plurality of power supplied devices have different specific resonance frequencies.

21. The contactless power supply method according to claim 16, wherein the variable capacitor is a variable condenser.

22. The contactless power supply method according to claim 16, wherein the variable capacitor is a variable capacitance diode.

* * * * *